United States Patent
Kato

(10) Patent No.: US 11,164,472 B2
(45) Date of Patent: Nov. 2, 2021

(54) AUDIO LEARNING SYSTEM AND AUDIO LEARNING METHOD

(71) Applicant: DENSO CORPORATION, Kariya (JP)

(72) Inventor: Noriko Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 429 days.

(21) Appl. No.: 15/542,810

(22) PCT Filed: Dec. 22, 2015

(86) PCT No.: PCT/JP2015/006369
§ 371 (c)(1),
(2) Date: Jul. 11, 2017

(87) PCT Pub. No.: WO2016/116992
PCT Pub. Date: Jul. 28, 2016

(65) Prior Publication Data
US 2018/0005537 A1 Jan. 4, 2018

(30) Foreign Application Priority Data

Jan. 19, 2015 (JP) .............................. JP2015-008175
Jul. 31, 2015 (JP) ................................. 2015-152126

(51) Int. Cl.
*G09B 5/04* (2006.01)
*B60W 50/08* (2020.01)
(Continued)

(52) U.S. Cl.
CPC .............. *G09B 5/04* (2013.01); *B60W 50/08* (2013.01); *G09B 7/02* (2013.01); *G09B 15/00* (2013.01);
(Continued)

(58) Field of Classification Search
CPC ....................................................... G09B 5/04
(Continued)

(56) References Cited

U.S. PATENT DOCUMENTS

2002/0188390 A1 12/2002 Ichihara et al.
2008/0167802 A1 7/2008 Yoshioka et al.
(Continued)

FOREIGN PATENT DOCUMENTS

JP H09281886 A 10/1997
JP 2002365061 A 12/2002
(Continued)

*Primary Examiner* — Kesha Frisby
(74) *Attorney, Agent, or Firm* — Harness, Dickey & Pierce, P.L.C.

(57) ABSTRACT

An audio learning system, which is applied to a vehicle and provides a learning content to a user staying in the vehicle in audio manner, includes: a learning element storage unit storing multiple learning elements; an in-vehicle duration estimation unit estimating an in-vehicle duration during which the user is in the vehicle; a learning program generation unit generating one batch of a learning program to be completed within the in-vehicle duration estimated by the in-vehicle duration estimation unit by combining the plurality of learning elements; and an execution unit executing the learning program. When a driving load estimated by a driving load estimation unit is higher than a predetermined load, the learning program generation unit generates the learning program to mainly include the learning elements that have been executed.

10 Claims, 11 Drawing Sheets

(51) Int. Cl.
*G09B 7/02* (2006.01)
*G09B 15/00* (2006.01)
*G09B 19/04* (2006.01)

(52) U.S. Cl.
CPC ......... *G09B 19/04* (2013.01); *B60W 2540/30* (2013.01)

(58) Field of Classification Search
USPC ........................................................ 434/319
See application file for complete search history.

(56) References Cited

U.S. PATENT DOCUMENTS

| | | | | |
|---|---|---|---|---|
| 2008/0177462 | A1* | 7/2008 | Yoshioka | G01C 21/343 701/532 |
| 2009/0030568 | A1* | 1/2009 | Amano | B60K 6/445 701/22 |

FOREIGN PATENT DOCUMENTS

| | | | |
|---|---|---|---|
| JP | 2003099080 | A | 4/2003 |
| JP | 2003114691 | A | 4/2003 |
| JP | 2005167880 | A | 6/2005 |
| JP | 2011085641 | A | 4/2011 |
| JP | 2013109308 | A | 6/2013 |
| JP | 2015017944 | A | 1/2015 |

* cited by examiner

FIG. 5B

| LEARNING GOAL IN CURRENT LEARNING: LEARN HOOK PORTION OF LYRICS OF WESTERN MUSIC | |
|---|---|
| STEP 1 | LECTURE ON PRONUNCIATION AND MEANING OF WORDS EXTRACTED FROM HOOK PORTION RECORD AND REPRODUCE USER'S PRONUNCIATION FOR CHECKING |
| STEP 2 | LECTURE ON PRONUNCIATION AND TRANSLATION OF PHRASES INCLUDING LEARNED WORDS RECORD AND REPRODUCE USER'S PRONUNCIATION FOR CHECKING |
| STEP 3 | CONNECT AND EXTEND LEARNED PHRASES RECORD AND REPRODUCE USER'S PRONUNCIATION FOR CHECKING |
| STEP 4 | SING HOOK PORTION ACCORDING TO ACCOMPANIMENT RECORD AND REPRODUCE USER'S PRONUNCIATION FOR CHECKING |

AUDIO LEARNING SYSTEM AND AUDIO LEARNING METHOD

CROSS REFERENCE TO RELATED APPLICATIONS

This application is a U.S. National Phase Application under 35 U.S.C. 371 of International Application No. PCT/JP2015/006369 filed on Dec. 22, 2015 and published in Japanese as WO 2016/116992 A1 on Jul. 28, 2016. This application is based on and claims the benefit of priority from Japanese Patent Application No. 2015-008175 filed on Jan. 19, 2015 and Japanese Patent Application No. 2015-152126 filed on Jul. 31, 2015. The entire disclosures of all of the above applications are incorporated herein by reference.

TECHNICAL FIELD

The present disclosure relates to an audio learning system and an audio learning method each of which enables a user who stays in a vehicle to learn through listening.

BACKGROUND ART

An audio learning technique that enables learning, even under circumstances where it is difficult to see a text or the like, with the provision of a learning content to the user in audio format has been known. With the use of the audio learning technique, it is possible for the user to learn during a driving of the vehicle.

Generally, such an audio learning content is provided by a learning program scheduled for a predetermined learning duration (for example, one hour) for one batch. Also, a technique has been proposed in which a user who learns can freely set his learning duration (Patent Literature 1).

PRIOR ART LITERATURE

Patent Literature

Patent Literature 1: JP-A-2013-109308

SUMMARY OF INVENTION

In the conventional art, there has been a problem that a user (for example, a driver) cannot easily continue learning in the vehicle even if the conventional audio learning technique is applied to the vehicle. This is due to the following reason. First, as described above, when the learning duration for one batch of learning program is determined in advance, for example, when a required duration for traveling in the vehicle is shorter than the predefined learning duration, the driver cannot secure a duration necessary for learning. For that reason, the driver may give up a start of learning in the present driving. Further, in the case of setting the learning duration by himself as in Patent Literature 1, since the driver needs decision making, he may hesitate to start learning. Thus, learning is likely to be interrupted by procrastination.

The present disclosure has been made in view of the above-described difficulties with the conventional art, and it is an object of the present disclosure to provide an audio learning system and an audio learning method each of which is capable of promoting continuous learning in the vehicle.

According to an aspect of the present disclosure, an audio learning system includes a learning element storage unit, an in-vehicle duration estimation unit, a learning program generation unit, and an execution unit. The audio learning system is applied to a vehicle and provides a learning content to a user staying in the vehicle in audio manner. The learning element storage unit stores a plurality of learning elements prepared for the learning content. The in-vehicle duration estimation unit estimates an in-vehicle duration during which the user stays in the vehicle. The learning program generation unit generates one batch of a learning program to be completed within the in-vehicle duration estimated by the in-vehicle duration estimation unit by combining the plurality of learning elements. The execution unit executes the learning program.

According to the audio learning system of the present disclosure as described above, completion of the learning is guaranteed to be completed within the in-vehicle duration. Thus, the user can be prompted to start learning without any procrastination for a reason that a duration necessary for learning cannot be secured. In addition, since the learning duration is set according to the in-vehicle duration, a driver's decision making is unnecessary. The user may feel a sense of accomplishment by surely completing one batch of learning program during the in-vehicle duration, and motivation of a next learning is enhanced, as a result of which continuous learning in the vehicle can be promoted.

According to another aspect of the present disclosure, an audio learning method, which is applied to a vehicle and provides a learning content to a user staying in the vehicle in audio manner, is provided. The audio learning method includes: estimating an in-vehicle duration during which the user stays in the vehicle; generating one batch of learning program to be completed within the in-vehicle duration by combining a plurality of learning elements, the plurality of learning elements being prepared for the learning content and stored in advance; and executing the learning program.

With the above-described audio learning method, the user in the vehicle can be prompted to perform continuous learning in the vehicle.

BRIEF DESCRIPTION OF DRAWINGS

The above and other objects, features and advantages of the present disclosure will become more apparent from the following detailed description made with reference to the accompanying drawings. In the drawings:

FIG. 5B is a diagram illustrating a learning goal and learning contents of each step in an example of language learning illustrated in FIG. 5A;

EMBODIMENTS FOR CARRYING OUT INVENTION

Hereinafter, embodiments will be described for clarifying details of the present disclosure.

A. Device Configuration

Figure 1:
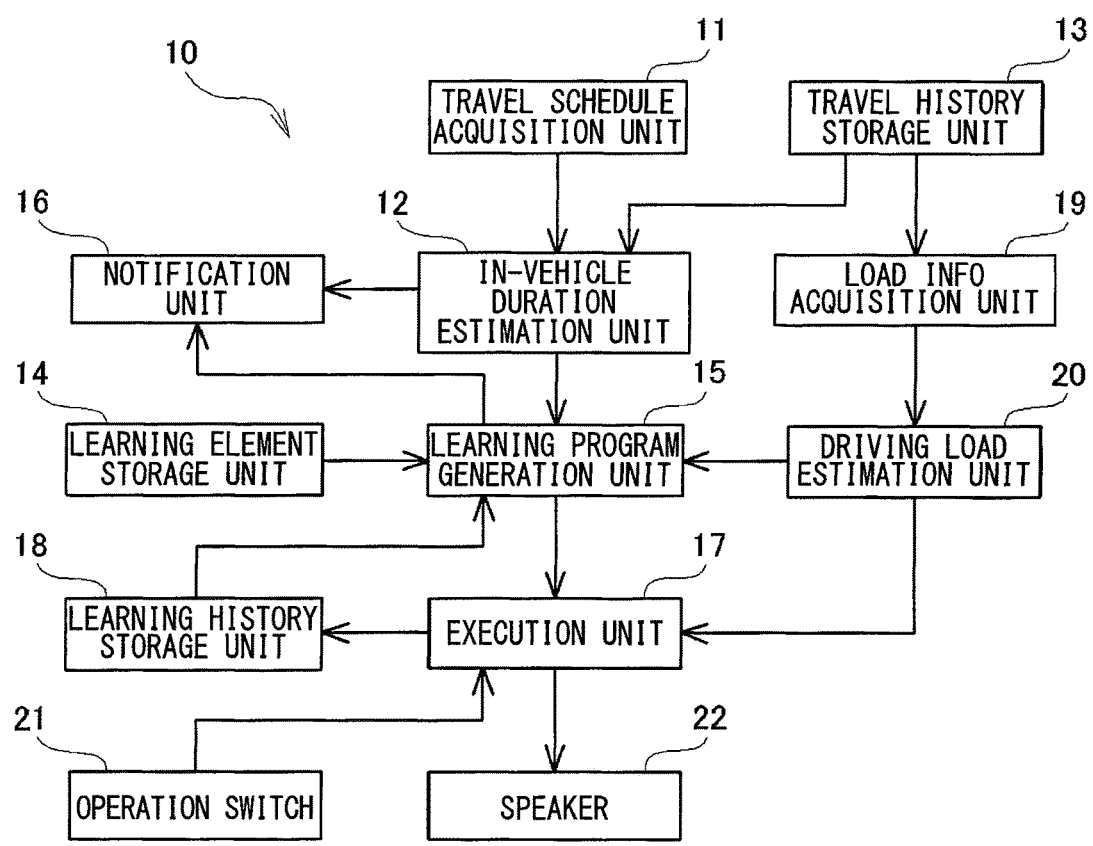
FIG. 1 is an illustrative view illustrating a configuration of an audio learning system according to an embodiment of the present disclosure.

FIG. 1 illustrates a configuration of an audio learning system 10 according to the present embodiment. The audio learning system 10 according to the present embodiment is mounted on a vehicle and provides a learning content to a user (for example, a driver) in the vehicle in audio manner. As shown in the figure, the audio learning system 10 includes a travel schedule acquisition unit 11, an in-vehicle duration estimation unit 12, a travel history storage unit 13, a learning element storage unit 14, a learning program generation unit 15, a notification unit 16, an execution unit 17, a learning history storage unit 18, a load information acquisition unit 19, a driving load estimation unit 20, and the like.

It is to be noted that those ten "units" 11 to 20 are conceptually classified focusing on functions of the audio learning system 10, and it is not always necessary for each of the "units" 11 to 20 to exist as physical and independent units. Those units can be configured by various devices, electronic components, integrated circuits, computers, computer programs, combinations of those components, and the like.

The travel schedule acquisition unit 11 acquires a departure place, a destination, and the like of the vehicle that starts to travel. For example, when the destination is set in a vehicle-mounted navigation system, which is not shown, the travel schedule acquisition unit 11 acquires the set destination, and acquires a current position of the vehicle as a departure place.

The in-vehicle duration estimation unit 12 estimates a duration required for traveling from the departure place to the destination as an in-vehicle duration (in other words, a duration staying in the vehicle) based on the travel schedule acquired by the travel schedule acquisition unit 11.

The travel history storage unit 13 stores a history of the travel of the vehicle in the past together with a date, a day of the week, a time, and the like.

The in-vehicle duration estimation unit 12 estimates a duration during which a driver stays in the vehicle that traveled to a specific location based on a habitual behavior of the driver stored as a history in the travel history storage unit 13 as the in-vehicle duration.

The learning element storage unit 14 stores multiple learning elements configuring audio learning contents. The audio learning system 10 according to the present embodiment provides contents for learning a language (for example, a user whose native language is Japanese learns English). The learning element storage unit 14 stores, in advance, a large number of words and short phrases as learning elements configuring the contents for language learning.

The learning program generation unit 15 sets a learning duration shorter than the in-vehicle duration estimated by the in-vehicle duration estimation unit 12, and generates one batch of learning program to be finished within the set learning duration by a combination of two or more of the multiple learning elements stored in the learning element storage unit 14. The learning program includes multiple learning elements whose total learning duration is shorter than the in-vehicle duration, and the multiple learning elements is also referred to as a learning target set or a learning target course.

The notification unit 16 notifies the user in the vehicle of the in-vehicle duration estimated by the in-vehicle duration estimation unit 12 and the learning duration of the learning program generated by the learning program generation unit 15.

The execution unit 17 is connected to an operation switch 21 that can be operated by the user. When a start request operation is performed by the user on the operation switch 21, the execution unit 17 executes the learning program generated by the learning program generation unit 15, and outputs the audio learning program from a speaker 22.

The learning history storage unit 18 stores the learning program (in other words, the learning element that has been executed) executed by the execution unit 17.

The load information acquisition unit 19 acquires information (hereinafter referred to as "load information") for estimating a driving load of the driver of the vehicle.

The driving load estimation unit 20 estimates the driving load of the driver based on the acquired load information.

For example, the driving load estimation unit 20 acquires the travel history from the travel history storage unit 13 as the load information. The driving load estimation unit 20 estimates that the driving load is lower than a predetermined load if a current travel is a travel familiar to the driver due to commuting or the like. On the other hand, the driving load estimation unit 20 estimates that the driving load is higher than a predetermined load if the current travel is a travel unfamiliar to the driver with no travel history. Further, the driving load estimation unit 20 acquires, as the load information, map information of a travel route from the departure place to the destination, and the driving load estimation unit 20 estimates that the driving load is higher than the predetermined load if the map information is indicative of a section requiring attention in driving such as a section where traffic is heavy or a section where a curve continues.

When the user who is learning is a driver, the learning program generation unit 15 generates a learning program different in the difficulty level according to the driving load estimated by the driving load estimation unit 20.

The driving load estimation unit 20 estimates a real-time driving load while the vehicle is traveling.

For example, the driving load estimation unit 20 estimates that the driving load is higher than the predetermined load based on the acquisition of information accompanying a warning such as for approach of an obstacle from a camera or a sensor that monitors the surroundings of the vehicle as the load information during traveling. In addition, the driving load estimation unit 20 estimates that the driving load is higher than the predetermined load based on the acquisition of information indicating sudden braking or sudden steering from an operation unit such as an accelerator, a brake, a steering wheel or the like. Furthermore, the driving load estimation unit 20 may estimate that the driving load is higher than the predetermined load assuming that the driver has no elbow room if the amount of movement of a driver's visual line decreases, based on the amount of movement of the driver's visual line obtained from the camera monitoring the driver.

If the user who is learning is a driver, the execution unit 17 interrupts the execution of the learning program when it is estimated that the driver's driving load is higher than the predetermined load during the travel of the vehicle.

Figure 2:
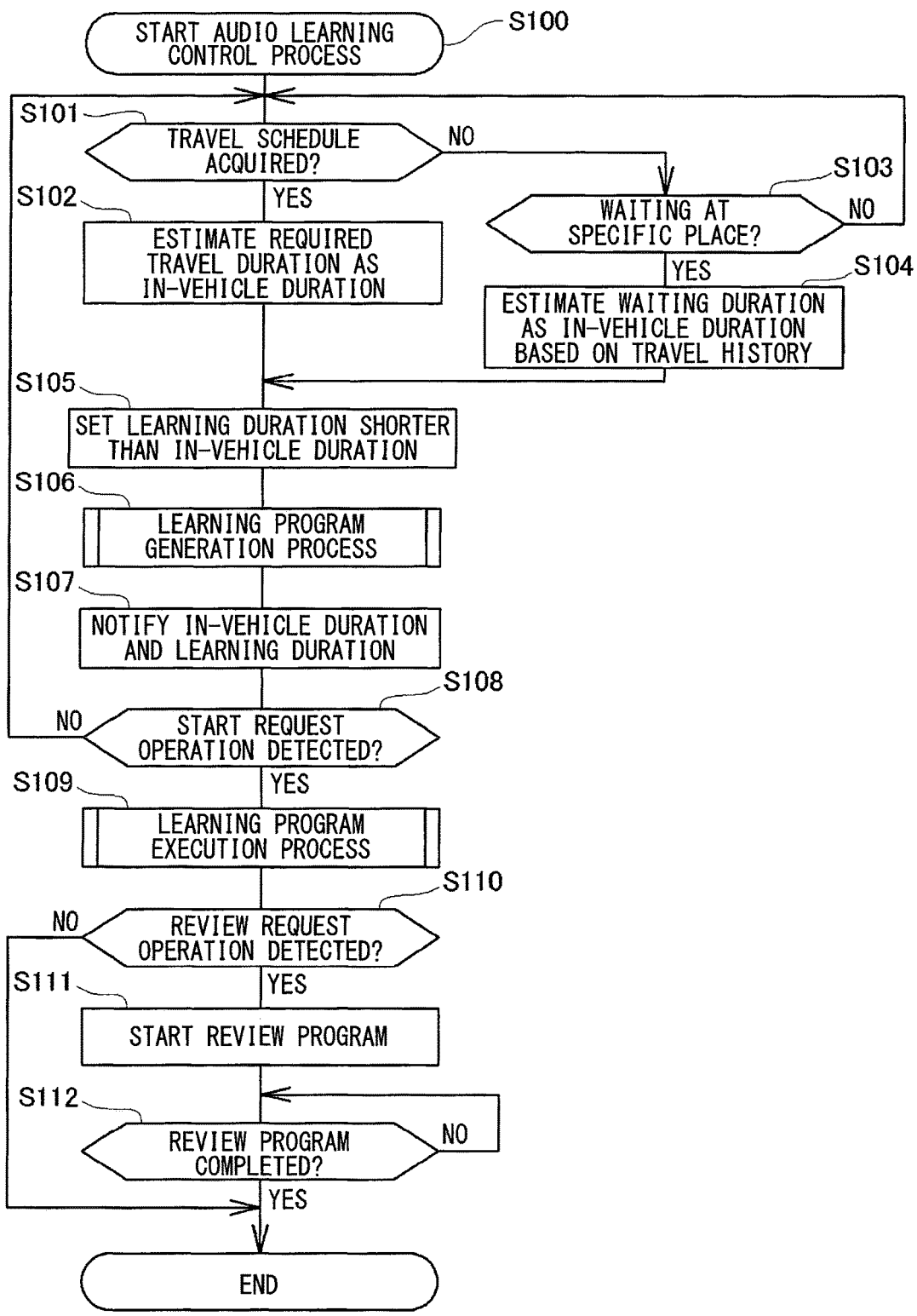
FIG. 2 is a flowchart illustrating an audio learning control process to be executed by the audio learning system according to the embodiment of the present disclosure.

B. Audio Learning Control Process:

FIG. 2 illustrates a flowchart of the audio learning control process to be executed by the audio learning system 10 according to the present embodiment.

The audio learning control process (S100) is started when the user activates the audio learning system 10. The audio learning control process may be started in synchronization with an engine start of the vehicle. When the audio learning control process (S100) is started, it is first determined whether a departure place or a destination has been acquired as a travel schedule of the vehicle (S101). When the destination is set in the navigation system, if the destination and the departure place (for example, current location) are acquired (S101: YES), the duration required for travel from the departure place to the destination is estimated as the in-vehicle duration (S102).

On the other hand, if the travel schedule has not been acquired (S101: NO), it is determined whether the user is waiting at a specific place, or not, with reference to the travel history of the vehicle (S103). The travel history of the vehicle is stored together with the date, the day of the week, and the time. Thus, a habitual behavior of the driver can be predicted based on the travel history. For example, if it is customary that a mother who has driven a child to a cram school by car waits in a cram school parking lot until the cram school ends, the cram school parking lot is registered as a specific place. If it is determined that the mother is waiting in the parking lot of the cram school (S103: YES), the waiting duration in the cram school parking lot is estimated as the in-vehicle duration based on a behavior prediction from the travel history (S104).

On the other hand, if the user is not waiting at the specific place (S103: NO), the process returns to a beginning of the audio learning control process (S100), and it is determined again whether the travel schedule of the vehicle has been acquired, or not (S101).

While repeating the above process, when the duration required for traveling or the waiting duration at the specific place is estimated as the in-vehicle duration, a learning duration shorter than the estimated in-vehicle duration is set (S105). In the present embodiment, the learning duration that is set to be shorter than the estimated in-vehicle duration by a predetermined margin time period (for example, 10 minutes). For example, in the case where the in-vehicle duration is estimated to be 50 minutes, 10 minutes of the margin time period is subtracted from the in-vehicle duration, and the learning duration is set to 40 minutes. The reason for providing the margin time period will be described later.

After setting the learning duration, a process (hereinafter, referred to as "learning program generation process") for generating the learning program according to the learning duration is started (S106). As described above, in the present embodiment, a large number of words and short phrases are stored in advance as the learning elements configuring the contents for language learning, and the learning program is generated by combining two or more of those elements together. At that time, the learning duration can be adjusted according to the number of learning elements to be selected, individual reproduction times, the number of repeats of reproduction, and the like.

Figure 3:
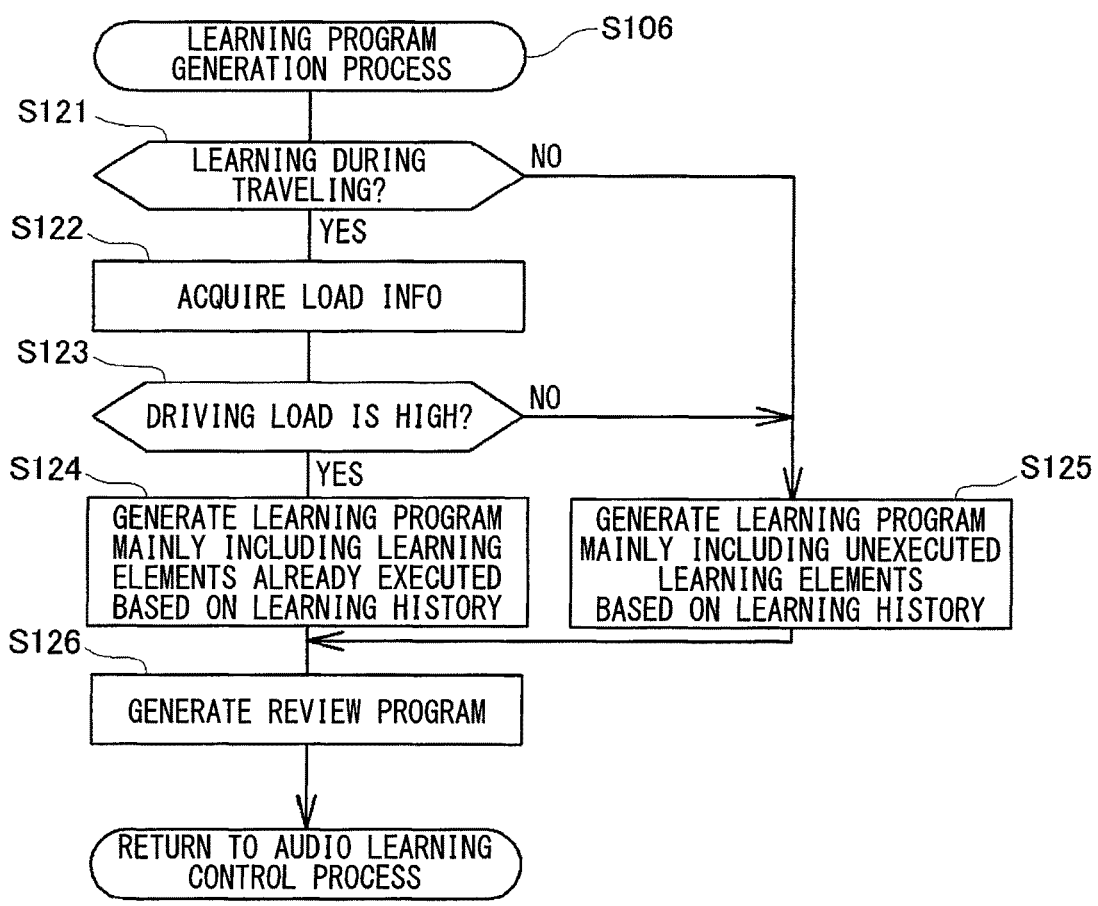
FIG. 3 is a flowchart illustrating a learning program generation process according to the embodiment of the present disclosure.

FIG. 3 illustrates a flowchart of the learning program generation process according to the present embodiment. As shown in the drawing, in the learning program generation process (S106), it is first determined whether the learning is to be performed while the vehicle is traveling, or not (S121). If the travel schedule has been acquired in the process of S101 described above and it is determined that the learning is to be performed during the travel (S121: YES), the load information on the current travel is acquired (S122), and it is determined whether the driving load estimated based on the load information is higher than the predetermined load, or not (S123). In the present embodiment, the driving load is estimated in two levels of high and low. For example, if it is estimated that the current travel is the travel unfamiliar to the driver with no history and the driving load is estimated to be higher than the predetermined load with reference to the travel history acquired as the load information (S123: YES), a learning program mainly including the learning elements that have been already executed (words and phrases in this case) is generated based on the learning history stored in advance (S124).

In a situation where the driving load is high, the attention of the driver is directed to driving. Thus, the consciousness to learning (that is, comprehension) tends to decrease. Therefore, the learning program is configured based on the learning elements that have already been executed rather than a new learning element that has not yet been executed, resulting in a reduction in the difficulty level of learning. This makes it possible that the driver continue to learn in reviewal manner while the driver directs the attention to the driving.

In the case of estimating the driving load based on the map information on a travel route acquired as the load information, a portion to be reproduced in a section in which the driving load is estimated to be high may be mainly configured by the learning elements which have already been executed. Also, a mode of lowering the learning difficulty is not limited to the configuration based on the learning elements that have already been executed, but the number of repeats of reproduction may be increased alternatively.

On the other hand, for example, when the current travel is the travel familiar to the driver due to commuting or the like and it is estimated that the driving load is low (S123: NO), the learning program mainly including the unexecuted learning elements (in this example, words or phrases) is generated with reference to the stored learning history (S125).

In a situation where the driving load is low, the driver has an elbow room, and turns the consciousness into learning and the comprehension tends to increase. Therefore, the learning program is mainly configured based on the unexecuted learning elements, and learning can be progressed by positively taking new contents.

With reference to map information on a travel route, a portion to be reproduced in a section in which the driving load is estimated to be low may be mainly configured by the unexecuted learning elements.

On the other hand, if it is determined that the learning is not the learning which is performed during the travel in the process of S121, that is, the learning is performed while waiting at the specific place (S121: NO), there is no need to pay attention to driving, resulting in a situation where the user can concentrate on the learning. Therefore, a learning program mainly including the unexecuted learning elements is generated (S125).

After the learning program has been generated according to the learning environment as described above, subsequently, the review program is generated (S126). As described above, in the present embodiment, a learning duration is set to be shorter than the estimated in-vehicle duration by a predetermined margin time period (for example, 10 minutes), and after the completion of the learning program according to the learning duration, the margin time period is secured. With the use of the margin time period, a review program to review the current learning can be executed.

The review program is ended within the margin time period by the combination of two or more of the learning elements included in the learning program generated in S124 or S125.

With the preparation of such a review program, it is possible to respond to a motivation of the user who wishes to review the whole learning which has been completed according to the learning program, thereby being capable of further enhancing the sense of achievement of learning.

Upon the generation of the review program as described above, the learning program generation process of FIG. 3 is completed and the process returns to the audio learning control process of FIG. 2.

In the audio learning control process, when returning from the subroutine of the learning program generation process (S106), the in-vehicle duration estimated in S102 or S104 and the learning duration set in S105 are notified to the user who is in the vehicle (S107).

The notification may be performed in audio manner or may be displayed on a display device not shown.

The learning duration is compared with the in-vehicle duration in this manner, thereby being capable of emphasizing that the learning ends within the in-vehicle duration. As a result, there is no need that the user hesitates to start learning for the reason that the time necessary for the learning cannot be secured, and thus, the start of learning can be prompted.

Subsequently, it is determined whether a start request operation by the user is detected by the operation switch 21 within a predetermined time, or not (S108). If the start request operation is not detected even after the lapse of the predetermined time (S108: NO), it is determined that, currently, the user is not willing to start learning, and the process returns to the beginning of the audio learning control process (S100), and a series of processes described above is repeated.

On the other hand, if the start request operation is detected (S108: YES), a process of executing the learning program (hereinafter referred to as "learning program execution process") is started (S109).

In the present embodiment, the learning program execution process is started in response to the user's start request operation. Alternatively, when the vehicle starts to travel, the learning program execution process may be configured to automatically start. With the above configuration, it becomes unnecessary for the user to make a decision at the start of the learning, and the user who stays in the vehicle can be prompted to learn while traveling.

Figure 4:
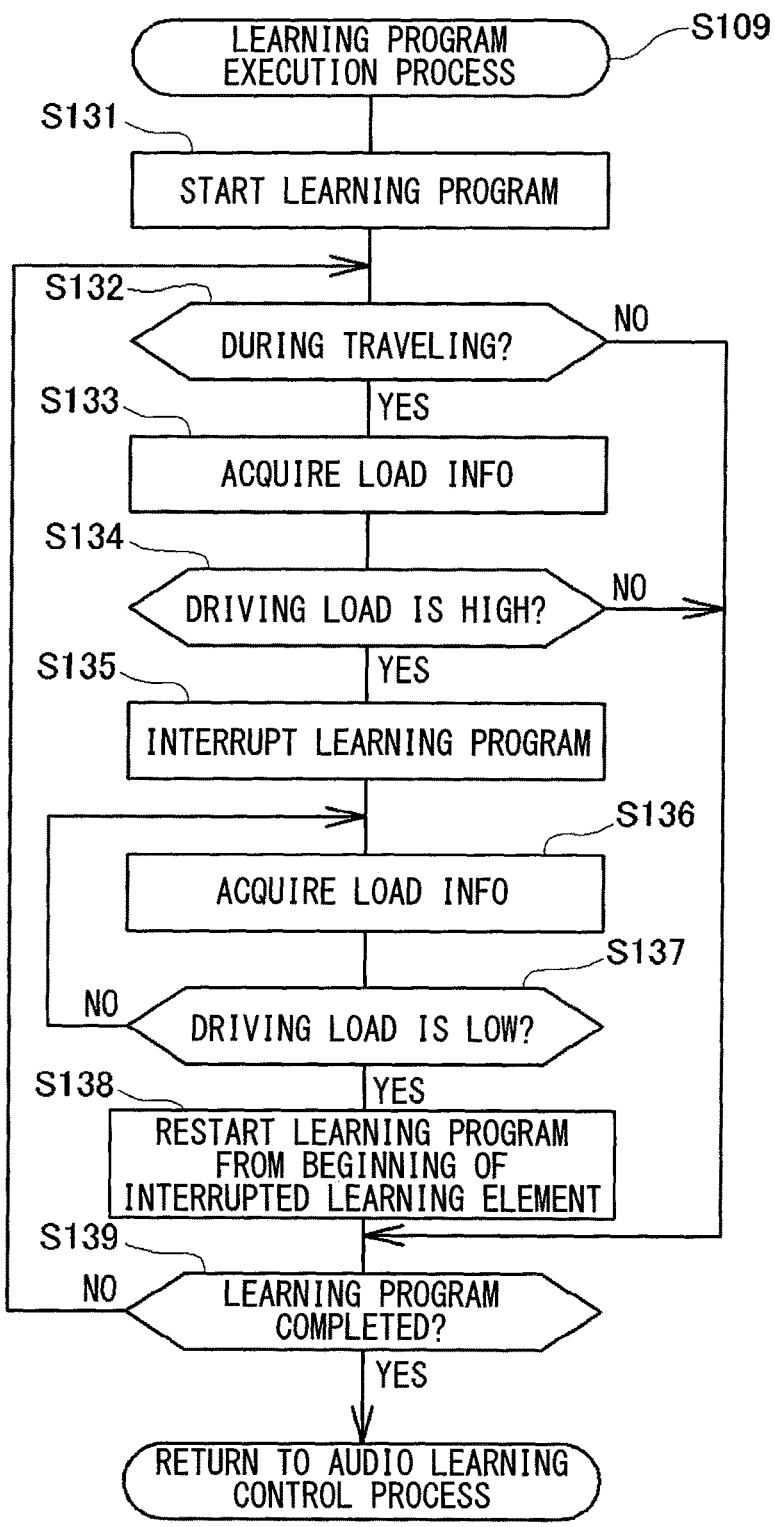
FIG. 4 is a flowchart illustrating a learning program execution process according to the embodiment of the present disclosure.

FIG. 4 illustrates a flowchart of the learning program execution process according to the present embodiment. In the learning program execution process (S109), the learning program generated in S124 or S125 in FIG. 3 is started (S131). As a result, sound is output from the speaker 22 according to the learning program.

Subsequently, it is determined whether the vehicle is traveling, or not (S132). If the vehicle is traveling (S132: YES), real-time load information is acquired (S133), and it is determined whether the driving load estimated based on the load information is high, or not (S134). For example, when information accompanying a warning such as for approach of an obstacle is acquired and it is estimated that the driving load is high (S134: YES), the execution of the learning program is interrupted (S135). In the situation where the driving load is temporarily high, since the driver is focusing on driving and has no elbow room to learn, learning is temporarily stopped and priority is given to safety assurance.

Thereafter, real-time load information is again acquired (S136), and it is determined whether the estimated driving load is low based on the acquired load information, or not (S137). If the driving load still continues to be high (S137: NO), the process returns to S136 to wait until the driving load decreases while estimating the real-time driving load.

Then, in the above example, when the warning such as for the approach of an obstacle is canceled and it is estimated that the driving load is low (S137: YES), the process returns to the beginning of the interrupted learning element (in this example, a word or a phrase), and the execution of the learning program is continued (S138).

When the learning program is interrupted in the middle of the learning element, it is difficult to understand the meaning even if the learning program is continued from the interrupted middle portion as it is. Therefore, the understanding of the interrupted learning can be facilitated by returning to the beginning of the learning element with a proper separation and continuing the execution of the learning program from the returned learning element.

When the execution of the learning program is interrupted, the contents of the learning program can be adjusted according to the interruption duration by reducing the number of learning elements included in the learning program or by decreasing the number of repeats of reproduction.

In the above description, a case in which it is determined that the vehicle is traveling in the process of S132 (S132: YES) and the driving load is estimated to be higher than the predetermined load in the process of S134 (S134: YES) has been described. On the other hand, if the vehicle is not traveling (S132: NO), since there is no need to estimate the driving load, the processing of S133 to S138 is omitted. If the driving load is estimated to be lower than the predetermined load (S134: NO), since there is no need to interrupt the learning program, the processing of S135 to S138 is skipped and it is determined whether the learning program has been completed, or not (S139).

If the learning program has not yet been completed (S139: NO), the process returns to S132 to execute the above-described series of processes.

Then, when all of the learning programs have been completed (S139: YES) while repeating the process, the learning program execution process of FIG. 4 is completed and the process returns to the audio learning control process of FIG. 2.

In the audio learning control process, when returning from the subroutine of the learning program execution process (S109), it is determined whether review request operation is made by the user on the operation switch 21 within the predetermined time, or not (S110). As described above, in the present embodiment, when the learning program is completed, the review program can be executed in the remaining margin time period. Therefore, when the review request operation has been detected (S110: YES), the review program generated in S126 of FIG. 3 is started (S111).

Subsequently, it is determined whether the review program has been completed, or not (S112). If the review program has not yet been completed (S112: NO), the process waits until the completion. If the overall review program has been completed (S112: YES), the audio learning control process of FIG. 2 is completed.

On the other hand, if the review request operation is not detected even after the lapse of the predetermined time (S110: NO), it is determined that, currently, the user is not willing to review the contents. Thus, the processing of S111 to S112 is omitted, and the audio learning control process of FIG. 2 is completed.

Figure 5A:
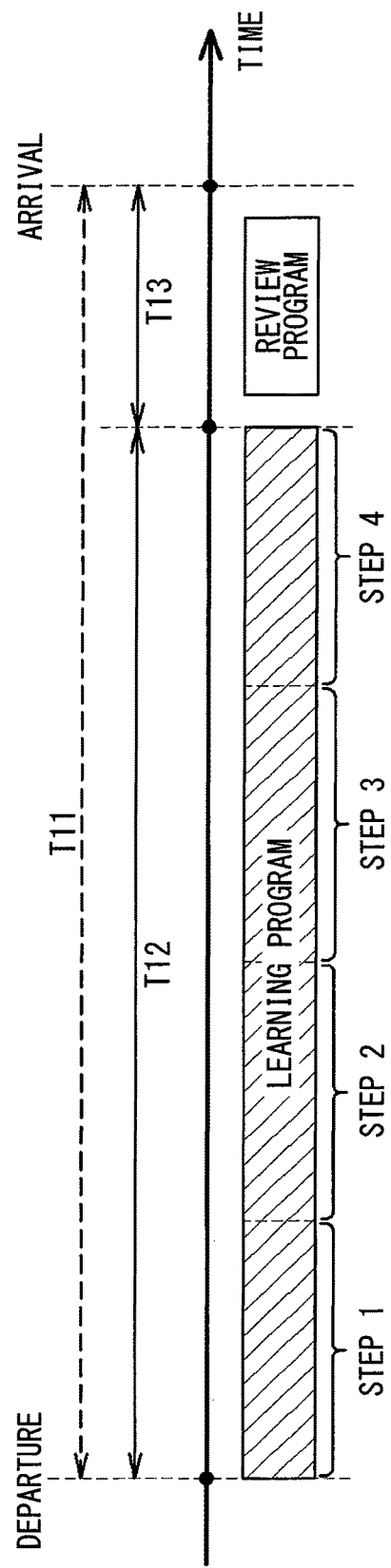
FIG. 5A is an illustrative view schematically illustrating an example in which a driver in a vehicle learns a language according to an audio learning control process according to the embodiment of the present disclosure.

C. Example of Audio Learning Execution:

FIG. 5A schematically illustrates an example in which the driver in the vehicle learns the language according to the audio learning control process (S100) in the present embodiment described above. The abscissa in the figure shows a flow of time and goes to the right over time.

In an example illustrated in FIG. 5A, a learning duration (T12) is set to be shorter than the in-vehicle duration (T11), which is necessary for the travel of the vehicle, by a predetermined margin time period (T13), and the learning program is generated within the set learning duration. In addition, as illustrated in FIG. 5B, in the present language learning, learning programs include four steps from Step 1 to Step 4, with learning of a hook portion of Western music lyrics as a learning goal. When the vehicle starts traveling, the learning program is executed, and the driver starts the learning program in order from Step 1.

First, in Step 1, some unlearned words are extracted from the hook portion based on the driver's learning history, and the pronunciation and meaning lecture of those words are performed. Then, the driver repeatedly practices pronunciation of the word according to an audio guidance.

The inside of the vehicle is a private space isolated from the surroundings compared to the inside of a train or in a house, and if the driver is alone in the vehicle, since the driver can make a loud voice without disturbing others, the inside of the vehicle is the best place for practice of the pronunciation.

In addition, the pronunciation of the word by the driver is recorded, and reproduced continuously. The driver listens to his or her own pronunciation and checks the pronunciation, thereby being capable of improving the learning effect of pronunciation.

In the next Step 2, pronunciation of a short phrase including the word learned in Step 1 and a lecture of the translation are performed. The driver practices the pronunciation of short phrases repeatedly, and listens to the recorded own pronunciation to check the pronunciation.

Subsequently, in Step 3, the short phrases learned in Step 2 are joined and gradually made into long phrases. The driver repeatedly practices the pronunciation of the phrase which gradually becomes longer, and listens to his own pronunciation for checking the pronunciation.

In the last Step 4, the driver practices while singing the entire hook portion according to an accompaniment, listens to the recorded pronunciation and checks the pronunciation.

Even when the learning program is completed in this manner, a margin time period is secured before arriving at the destination, and the review program is executed within the margin time period for the driver who wishes to learn a little more as the increase of motivation for learning.

In the review program, as in Step 4 of the learning program, the driver practices while singing the hook portion according to the accompaniment, and the driver can improve the degree of mastery while reviewing this learning.

As described above, in the audio learning system 10 according to the present embodiment, the in-vehicle duration during which the user (for example, the driver) stays in the vehicle is estimated and the learning program having the learning duration shorter than the in-vehicle duration is generated. The user can be prompted to start the learning by ensuring that the learning is completed within the in-vehicle duration. In addition, since the learning duration is set according to the in-vehicle duration, a driver's decision making is unnecessary. There is a sense of accomplishment by surely completing one batch of learning program during the in-vehicle duration, and motivation of a next learning is enhanced, as a result of which continuous learning in the vehicle can be promoted.

In addition, in the present embodiment, the learning duration is set to be shorter than the in-vehicle duration by the predetermined margin time period, the margin time period is secured after the learning program has been completed, and the review program can be executed within the margin time period. With the execution of the review program for the user whose motivation to learning has been enhanced by the learning program, the feeling of achievement of learning can be further enhanced. As a result, the motivation for the next learning can be improved, and the learning in the vehicle can be continued.

D. Modifications

In recent years, vehicles having an auto-cruise function enabling automatic control of vehicle speed when a predetermined condition is satisfied while the vehicle is traveling have been developed.

As techniques for realizing the auto-cruise, for example, a technique (known as adaptive cruise control: ACC) in which a front of the vehicle is monitored with a radar or the like has been known. In this technique, if there is no preceding vehicle, the vehicle speed is controlled to be equal to a set speed, and if there exists a preceding vehicle, a preset inter-vehicle distance to the preceding vehicle is maintained. In addition, a technique in which a lane is recognized based on a front image captured by a camera, and the like and the steering is controlled so as to travel along the lane (known as lane keeping assist) has been known. According to those techniques, an accelerator, a brake, and a steering wheel are automatically operated, thereby being capable of remarkably reducing a driving burden of the driver.

In the following description, the audio learning system 10 according to a modification mounted on a vehicle having an auto-cruise function will be described focusing on differences from the above-described embodiment. In the description of the modification, the same reference numerals are given to the same configurations as those in the above-described embodiment, and a description thereof is omitted.

D-1. First Modification

Figure 6:
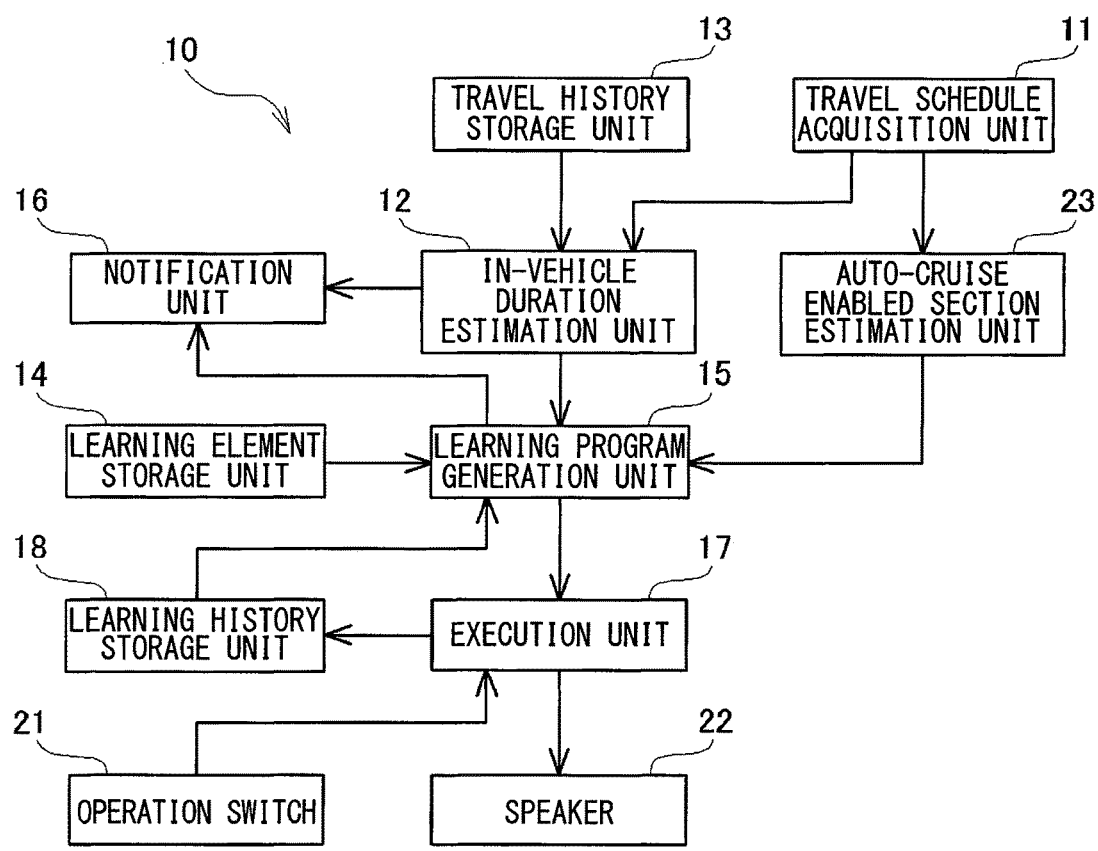
FIG. 6 is an illustrative view illustrating a configuration of an audio learning system according to a first modification of the present disclosure.

FIG. 6 illustrates a configuration of an audio learning system 10 according to a first modification. An audio learning system 10 according to a first modification includes an auto-cruise enabled section estimation unit 23 in place of the load information acquisition unit 19 and the driving load estimation unit 20 of the audio learning system 10 according to the embodiment described above. Similarly, the auto-cruise enabled section estimation unit 23 is conceptually classified focusing on functions of the audio learning system 10, and it is not always necessary for the auto-cruise enabled section estimation unit 23 to exist as physical and independent unit. The auto-cruise enabled section estimation unit can be configured by various devices, electronic components, integrated circuits, computers, computer programs, combinations of those components, and the like.

The auto-cruise enabled section estimation unit 23 estimates a section (hereinafter referred to as "auto-cruise enabled section") between a departure place and a destination in which the auto-cruise can be executed while satisfying a predetermined condition, based on the travel schedule acquired by the travel schedule acquisition unit 11.

In this modification, a specific road type such as a highway or an exclusive road for automobile vehicles is defined as a predetermined condition for enabling auto-cruise. For example, if there is a section to travel through a highway between the departure place and the destination of the travel schedule, the auto-cruise enabled section estimation unit 23 estimates that the highway section is the auto-cruise enabled section.

The highway allows for high-speed driving by eliminating intersections or moderately designing curves, and is suitable for auto-cruise because speed fluctuation and sudden steering are fewer than general roads.

Also, in a situation that is not suitable for auto-cruise (for example, rainy weather, dark night time, etc.) depending on weather and time zones scheduled for the travel, the auto-cruise enabled section estimation unit 23 determines that even the section traveling through the highway is not the auto-cruise enabled section.

Further, when a failure of the auto-cruise function is detected, the auto-cruise enabled section estimation unit 23 estimates that there is no auto-cruise enabled section.

When the in-vehicle duration estimation unit 12 estimates the duration required to travel from the departure place to the destination as the in-vehicle duration based on the travel schedule, the learning program generation unit 15 according to the first modification sets the learning duration to be shorter than the in-vehicle duration. When the user who uses the learning program is a driver, based on the estimation of the auto-cruise enabled section estimating section 23, the learning program generation unit 15 increases the difficulty level of learning in the auto-cruise enabled section compared to a section (hereinafter referred to as "manual driving section") that is not the auto-cruise enabled section, based on the estimation of the auto-cruise enabled section estimation unit 23, to thereby generate the learning program.

Figure 7:
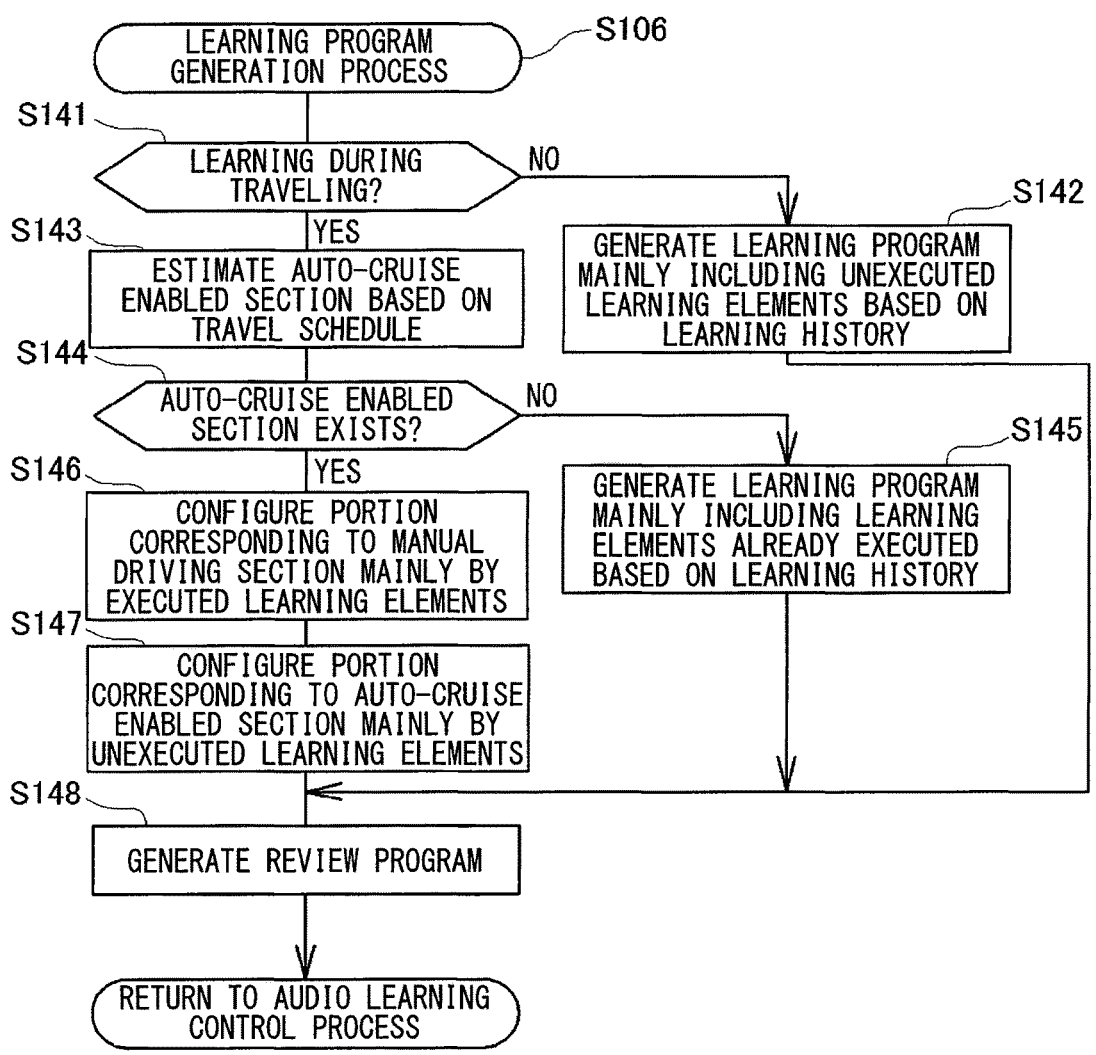
FIG. 7 is a flowchart illustrating a learning program generation process to be executed by the audio learning system according to the first modification of the present disclosure.

FIG. 7 is a flowchart illustrating a learning program generation process to be executed in the audio learning system 10 according to the first modification. In the learning program generation process (S106) according to the first modification, it is first determined whether the learning is to be performed during the travelling of the vehicle, or not (S141). If the learning to be performed is not the learning performed during the traveling of the vehicle, that is, the learning to be performed is the learning to be performed during a waiting at a specific place (S141: NO), since the driver can concentrate on the learning, the learning program mainly including the unexecuted learning elements is generated based on the stored learning history (S142).

On the other hand, if the learning is to be performed during the travel of the vehicle (S141: YES), the auto-cruise enabled section is estimated based on the travel schedule (S143). As described above, when the highway or the like is defined as the specific type of road that enables the auto-cruise, and the vehicle travels through the highway between the departure place and the destination, a travel section of the highway is estimated as the auto-cruise enabled section.

However, when rain or snow falls, fog occurs or it becomes dark due to sunset, an accuracy of detecting the preceding vehicle and an accuracy of recognizing the lane tend to decrease. Further, in a situation where the road surface is wet and slippery due to rain or the like, it may be difficult to maintain a set inter-vehicle distance between the preceding vehicle or to maintain the lane. Therefore, the section judged not to be suitable for the auto-cruise based on the weather and the time zone scheduled for the travel is excluded from the auto-cruise enabled section.

In this way, auto-cruise with high safety can be realized by taking into consideration fluctuation requirements such as the weather and the time zone as well as fixed requirements such as the specific road types as the predetermined conditions enabling auto-cruise.

When the auto-cruise enabled section is estimated in this manner, it is determined whether there is the auto-cruise enabled section between the departure place and the destination, or not (S144). When there is no auto-cruise enabled section (S144: NO), the driver manually drives throughout from the departure place to the destination, and the driver has to learn while paying attention to driving. Therefore, in order to lower the difficulty level of learning, the learning program mainly including the learning elements already executed is generated based on the stored learning history (S145).

On the other hand, when there is the auto-cruise enabled section between the departure place and the destination (S144: YES), the learning program of a portion corresponding to the manual driving section between the departure place and the destination is mainly configured by the learning elements already executed (S146), and the learning program of a portion corresponding to the auto-cruise enabled section is mainly configured by the unexecuted learning elements (S147).

In the auto-cruise enabled section, since the driving burden on the driver is greatly reduced by automatically performing the operation of the accelerator, the brake and the steering wheel, the driver can turn awareness into learning. Therefore, the subject of the learning element is changed between the manual driving section and the auto-cruise enabled section, and the difficulty level of learning in the auto-cruise enabled section is set to be higher than that in the manual operation section.

When the learning program is generated depending on whether the environment of learning is traveling or waiting as described above, and depending on whether there is the auto-cruise enabled section, or not, in the case of learning while traveling, the review program that is completed within the margin time period is then generated by the combination of two or more of the learning elements included in the generated learning program (S148).

After the review program has been generated, the learning program generation process of FIG. 7 is completed and the process returns to the audio learning control process of FIG. 2.

In the audio learning control process according to the first modification, the driving load of the driver is not estimated and when the learning program is started in the subsequent learning program execution process (S109), the driver waits until the program is completed regardless of whether the vehicle is traveling, or not. After the overall learning program has been completed, the learning program execution process (S109) is completed.

Figure 8:
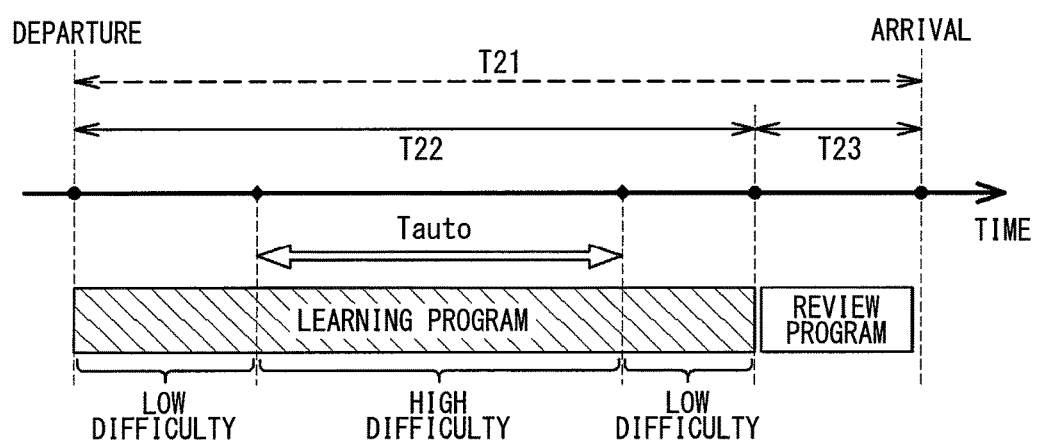
FIG. 8 is an illustrative view schematically illustrating an example in which a driver in a vehicle learns with use of the audio learning system according to the first modification of the present disclosure.

FIG. 8 schematically illustrates an example in which the driver in the vehicle learns with use of the audio learning system 10 according to the first modification. The abscissa in the figure shows a flow of time and goes to the right over time.

In the illustrated example, a learning duration (T22) is set to be shorter than the in-vehicle duration (T21), which is necessary for the travel of the vehicle, by a predetermined margin time period (T23). The learning program generated according to the learning duration is executed in response to the start of the travel of the vehicle, and after the learning program has been completed, the review program generated so as to be completed within the margin time period is executed according to the review request of the driver.

An auto-cruise enabled section (Tauto) traveling on the highway is present on a traveling route. For that reason, at the time of generation of the learning program, a portion corresponding to the manual driving section (that is, a section which is not the auto-cruise enabled section) is mainly configured by the learning elements already executed to set the difficulty level of learning to be low. A portion corresponding to the auto-cruise enabled section is mainly configured by the unexecuted learning elements to set the difficulty level of learning to be high.

As described above, in the audio learning system 10 according to the first modification, the auto-cruise enabled section is estimated based on the travel schedule. The subject of the learning elements configuring the learning program is changed between the manual driving section and the auto-cruise enabled section. The difficulty level of learning in the auto-cruise enabled section is increased as compared with that of the manual driving section. As a result, in the auto-cruise enabled section in which the burden of driving is reduced, the driver can actively learn new contents and efficiently progresses the learning program. At the same time, in the manual driving section, the driver can proceed the learning in review manner while paying attention to the driving.

D-2. Second Modification:

In the first modification described above, the difficulty level of the audio learning is set to be different between the manual driving section and the auto-cruise enabled section. Alternatively, the audio learning may be intensively executed in the auto-cruise enabled section.

An audio learning system 10 according to a second modification includes an auto-cruise enabled section estimation unit 23 similar to the first modification (refer to FIG. 6) described above.

An auto-cruise enabled section estimation unit 23 estimates, between a departure place and a destination, an auto-cruise enabled section which satisfies a predetermined condition, based on the travel schedule acquired by the travel schedule acquisition unit 11. The predetermined condition for enabling auto-cruise is similar to the first modification.

When the auto-cruise enabled section is estimated by the auto-cruise enabled section estimation unit 23, an in-vehicle duration estimation unit 12 according to the second modification estimates a duration required for traveling through the auto-cruise enabled section as the in-vehicle duration.

The learning program generation unit 15 sets the learning duration to be shorter than the in-vehicle duration estimated by the in-vehicle duration estimation unit 12, and generates the learning program according to the set learning duration.

Figure 9:
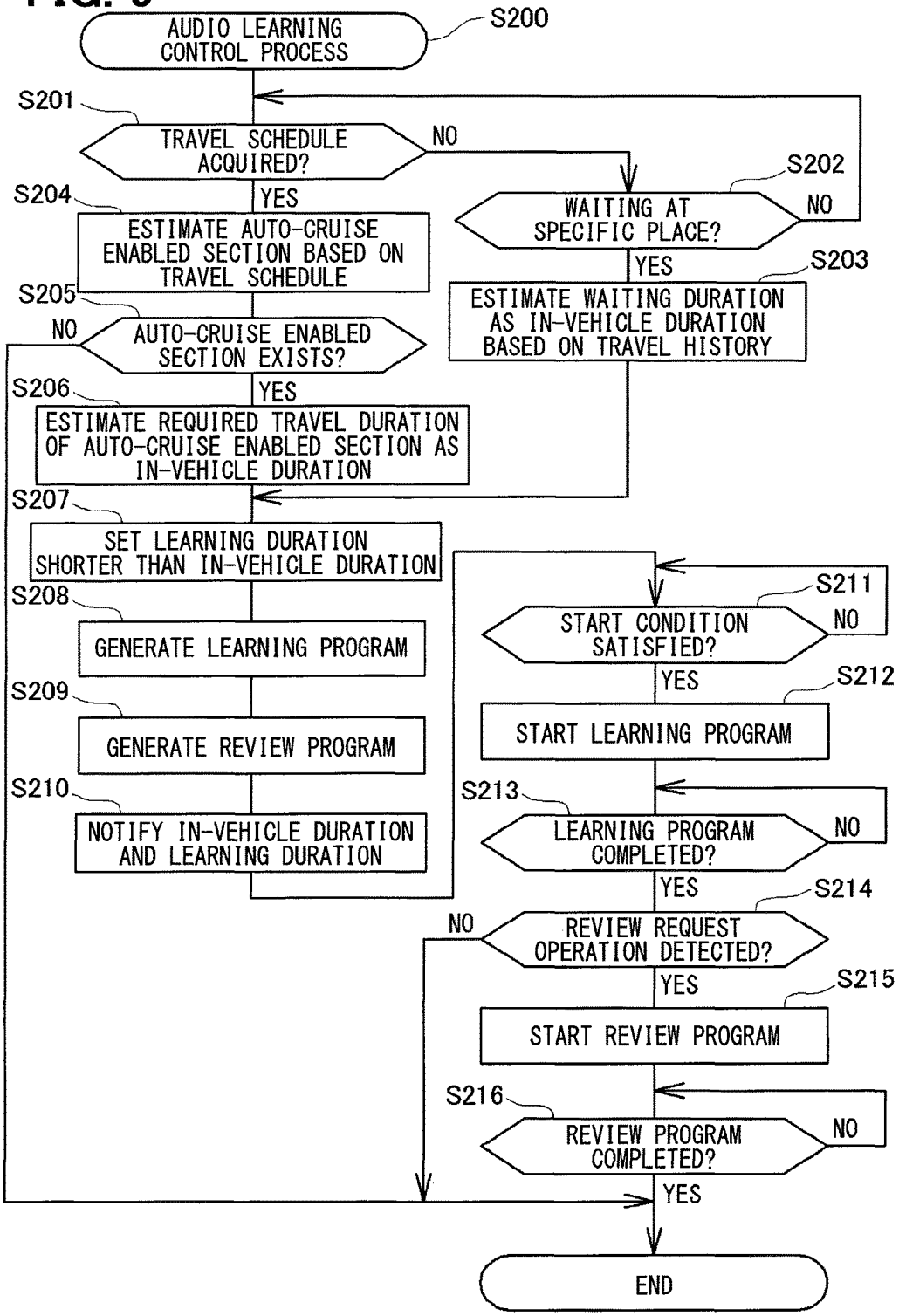
FIG. 9 is a flowchart illustrating an audio learning control process to be executed by an audio learning system according to a second modification of the present disclosure.

FIG. 9 illustrates a flowchart of the audio learning control process to be executed in the audio learning system 10 according to the second modification. When the audio learning control process (S200) according to the second modification is started, it is first determined whether the travel schedule of the vehicle has been acquired, or not (S201). If the travel schedule has not been acquired (S201: NO), it is subsequently determined whether the user is waiting at a specific place, or not, with reference to the travel history of the vehicle (S202).

If the user is waiting at the specific place (S202: YES), the waiting time based on the behavior prediction from the travel history is estimated as the in-vehicle duration (S203).

On the other hand, if the user is not waiting at the specific place (S202: NO), the process returns to the beginning of the audio learning control process (S200), and it is determined again whether the travel schedule of the vehicle has been acquired, or not (S201).

If the travel schedule is acquired (S201: YES), the auto-cruise enabled section is estimated based on the travel schedule (S204). A process of estimating the auto-cruise enabled section is similar to that of the first modification described above (refer to S143 in FIG. 7).

When the auto-cruise enabled section is estimated, it is determined whether there is the auto-cruise enabled section between the departure place and the destination, or not (S205). In the audio learning system 10 according to the second modification, the audio learning is intensively executed in the auto-cruise enabled section included in a route from a departure place to a destination. For that reason, when there is no auto-cruise enabled section (S205: NO), the audio learning control process is completed without executing the audio learning.

On the other hand, if there is an auto-cruise enabled section included in the route from the departure place to the destination (S205: YES), a duration required to travel the auto-cruise enabled section (for example, the traveling duration of a highway) is estimated as the in-vehicle duration (S206).

When the in-vehicle duration is estimated, the learning duration is set to be shorter than the in-vehicle duration by a predetermined margin time period (S207), and one batch of learning program to be completed within the set learning duration is generated by a combination of two or more of the multiple learning elements that are stored in the storage (S208). The review program completed within the margin time period is generated by the combination of two or more of the learning elements included in the generated learning program (S209).

In the second modification, the learning program is generated similarly for the learning performed while waiting at a specific place and the learning performed in the auto-cruise enabled section during traveling. Alternatively, a learning program different in the difficulty level may be generated.

Subsequently, after the user in the vehicle is notified of the estimated in-vehicle duration and the set learning duration (S210), it is determined whether a start condition of the audio learning has been satisfied, or not (S211). In the second modification, the learning during waiting at the specific place is started by detecting start request operation made by the user on the operation switch 21, and the learning during the traveling is started when the vehicle enters the auto-cruise enabled section.

If the start condition is not satisfied (S211: NO), the process waits as it is. If the start condition is satisfied (S211: YES), the learning program is started (S212).

After the learning program has been started, it is determined whether the learning program has been completed, or not (S213). If the learning program has not yet been completed (S213: NO), the process waits as it is. If the overall learning program has been completed (S213: YES), it is determined whether review request operation has been made by the user on the operation switch 21, or not (S214).

If the review request operation has been detected (S214: YES), the review program is started (S215). Subsequently, it is determined whether the review program has been completed, or not (S216). If the review program has not yet been completed (S216: NO), the process waits as it is. If the overall review program has been completed (S216: YES), the audio learning control process is completed.

On the other hand, if the review request operation has not been detected within the predetermined time (S214: NO), it is determined that, currently, the user is not willing to review the learning. Thus, the processing of S215 to S216 is omitted, and the audio learning control process is completed.

Figure 10:
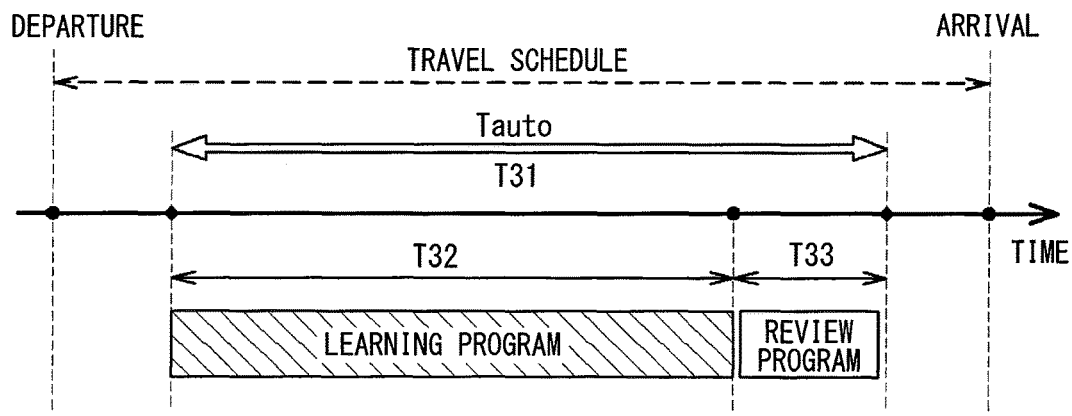
FIG. 10 is an illustrative view schematically illustrating an example in which a driver in a vehicle learns with use of the audio learning system according to the second modification of the present disclosure.

FIG. 10 schematically illustrates an example in which the driver in the vehicle learns by the audio learning system 10 according to the second modification. The abscissa in the figure shows a flow of time and goes to the right over time.

In the illustrated example, there is an auto-cruise enabled section (Tauto) that travels on a highway between a departure place and a destination of a travel schedule. For that reason, a learning duration (T32) is set to be shorter than the in-vehicle duration (T31), which is required to travel through the auto-cruise enabled section, by a predetermined margin time period (T33).

The learning program generated according to the learning duration is executed when the vehicle travels and enters the auto-cruise enabled section. After the learning program has been completed, the review program generated so as to be completed within the margin time period is executed according to the driver's review request.

As described above, in the audio learning system 10 according to the second modification, the auto-cruise enabled section is estimated based on the travel schedule, and the audio learning is intensively executed in the auto-cruise enabled section while the vehicle is traveling. When the vehicle enters the auto-cruise enabled section and switches to the auto-cruise driving mode, various operations of the vehicle are automatically performed. As a result, since the driving burden on the driver can be greatly reduced to allow the driver to have an elbow room, the time during the auto-cruise is particularly suitable for audio learning. For that reason, with the intensive execution of the audio learning in the auto-cruise enabled section, the driver can safely and effectively proceed with the audio learning.

The present embodiment and the modifications have been described above, but the present disclosure is not limited to the above embodiment and modifications, and can be variously implemented without departing from the spirit of the present disclosure.

For example, in the embodiment described above, the driving load is estimated in two levels of high and low. Alternatively, the driving load may be divided into multiple levels (for example, four levels of load 1 to load 4) for estimation. In this case, a learning program with a lower difficulty level (fewer unexecuted learning elements) as the estimated driving load becomes higher may be generated.

In the embodiment described above, the duration during which the user is in the vehicle (in-vehicle duration) such as the duration required for traveling or the waiting duration at the specific place is estimated. Alternatively, a duration during which the user is away from the vehicle between one travel and another travel may be estimated with reference to the travel history of the vehicle. For example, if a mother who drives a child to a cram school by the vehicle habitually comes home once and picks up the child again at a time when the cram school is ended, a duration (missing time period) during which she goes home once is estimated based on the behavior prediction from the travel history. If a learning program with a learning duration shorter than the missing time period is generated, and the learning can be performed by a mobile terminal carried by the mother, the learning can be continuously promoted with the use of the missing time period. Further, the present disclosure is not limited to the audio learning system described above, but may be provided as an audio learning method.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. An audio learning system applied to a vehicle and providing a learning content to a driver of the vehicle in audio manner, the audio learning system comprising:
   a learning element storage unit storing a plurality of learning elements prepared for the learning content;
   an in-vehicle duration estimation unit estimating an in-vehicle duration during which the driver stays in the vehicle;
   a load information acquisition unit acquiring load information, the load information being at least one of a travel history of the vehicle and a travel route of the vehicle from a departure place to a destination;
   a driving load estimation unit estimating the driving load of the driver based on the load information, the driving load indicating a level of attention a driver should pay to driving;
   a learning program generation unit generating and outputting, as the learning content, one batch of a learning program to be completed within the in-vehicle duration estimated by the in-vehicle duration estimation unit by combining the plurality of learning elements;
   an execution unit executing the learning program; and
   a learning history storage unit storing a learning history of the learning program executed by the execution unit,
   wherein,
   when the driving load estimation unit estimates that the driving load is higher than a predetermined threshold, the learning program generation unit reduces a difficulty level of the learning program based on the learning history, and automatically generates and outputs the one batch of the learning program to mainly include the plurality of learning elements that have already been executed.

2. The audio learning system according to claim 1, wherein
   when the driving load estimated by the driving load estimation unit is lower than the predetermined threshold, the learning program generation unit automatically generates and outputs, based on the learning history, the one batch of the learning program to mainly include the plurality of learning elements that have not yet been executed.

3. The audio learning system according to claim 1, further comprising:
   a travel schedule acquisition unit acquiring a travel schedule of the vehicle, wherein the in-vehicle duration estimation unit estimates, based on the travel schedule, a required duration for travelling from a departure place to a destination as the in-vehicle duration.

4. The audio learning system according to claim 3, wherein
the execution unit automatically executes the learning program when the vehicle starts to travel.

5. The audio learning system according to claim 1, further comprising
a notification unit notifying the user of the in-vehicle duration estimated by the in-vehicle duration estimation unit and a learning duration of the learning program generated by the learning program generation unit.

6. The audio learning system according to claim 1, wherein
the learning program generation unit generates the learning program such that a learning duration of the learning program is shorter than the in-vehicle duration estimated by the in-vehicle duration estimation unit by a predetermined margin time period,
the learning program generation unit generates a review program to be completed within the margin time period based on the learning elements included in the learning program, and
the execution unit executes the review program upon receiving a review request from the user after completion of the learning program.

7. The audio learning system according to claim 1, wherein
when the driving load estimation unit estimates that the driving load is lower than the predetermined threshold, the learning program generation unit automatically generates and outputs the one batch of the learning program mainly including a plurality of unexecuted learning elements based on the learning history.

8. An audio learning system applied to a vehicle and providing a learning content to a user staying in the vehicle in audio manner, the audio learning system comprising:

a learning element storage unit storing a plurality of learning elements prepared for the learning content;
an in-vehicle duration estimation unit estimating an in-vehicle duration during which the user stays in the vehicle;
a learning program generation unit generating, as the learning content, one batch of a learning program to be completed within the in-vehicle duration estimated by the in-vehicle duration estimation unit by combining the plurality of learning elements;
an execution unit executing the learning program; and
a travel history storage unit storing a travel history indicating a travel history of the user with use of the vehicle, wherein
the in-vehicle duration estimation unit estimates, based on the travel history, a duration during which the user customarily parks and stays in the vehicle at a parking location after travelling to the parking location as the in-vehicle duration.

9. The audio learning system according to claim 8, further comprising
a notification unit notifying the user of the in-vehicle duration estimated by the in-vehicle duration estimation unit and a learning duration of the learning program generated by the learning program generation unit.

10. The audio learning system according to claim 8, wherein
the learning program generation unit generates the learning program such that a learning duration of the learning program is shorter than the in-vehicle duration estimated by the in-vehicle duration estimation unit by a predetermined margin time period,
the learning program generation unit generates a review program to be completed within the margin time period based on the learning elements included in the learning program, and
the execution unit executes the review program upon receiving a review request from the user after completion of the learning program.

* * * * *